United States Patent [19]

Pierotti et al.

[11] Patent Number: 4,990,181

[45] Date of Patent: Feb. 5, 1991

[54] ALUMINIDE STRUCTURES AND METHOD

[75] Inventors: Kim D. Pierotti; Srinivas H. Swaroop; Raja R. Wusirika, all of Painted Post, N.Y.

[73] Assignee: Corning Incorporated, Corning, N.Y.

[21] Appl. No.: 323,449

[22] Filed: Mar. 14, 1989

[51] Int. Cl.$^5$ ............................................. B22F 9/00
[52] U.S. Cl. ............................... 75/246; 75/245; 75/249; 419/36; 419/37; 419/57
[58] Field of Search .................... 75/245, 246, 249; 419/36, 37, 57

[56] References Cited

U.S. PATENT DOCUMENTS 4,758,272  7/1988  Pierotti et al. .................. 75/246
4,762,558  8/1988  German et al. .................. 75/246

Primary Examiner—Stephen J. Lechert, Jr.
Attorney, Agent, or Firm—Richard N. Wardell

[57] ABSTRACT

The present invention is directed to porous sintered aluminide structures of aluminum, nickel, titanium, and/or rare earth metal. A process is disclosed for forming and sintering aluminides. Other components are optionally added to the aluminide compositions to vary the physical properties of the resultant structure.

26 Claims, No Drawings

ALUMINIDE STRUCTURES AND METHOD

BACKGROUND OF THE INVENTION

This invention is related to porous substrates sintered from aluminide powders and their alloys. In particular, nickel, titanium, and rare earth metal aluminides are structured with the addition and/or substitution of other metal components.

Processes for making porous aluminide substrates from metal powders have been burdened by the presence of an oxide layer, making sintering operations difficult to impossible. The present invention introduces an aluminide component in a structure in cooperation with various alloy combinations. These combinations are useful as wear and chemically resistant, mechanically stable substrates for use in harsh environments, such as exhaust and corrosive pathways. Methods of use for aluminide structures may be advantageously employed in filtering operations, e.g. diesel particulate filters or molten metal filters, or as catalyst supports for catalytic converters or DeNOx applications. Consequently, these structures can be placed as catalyzed structures in the exhaust path of power plants and internal combustion engines.

Equally beneficial uses may be found for the formed product as a structural material. For example, when extruded as a honeycomb structure the aluminide material is light weight with abundant lateral and vertical mechanical strength, providing a light weight structural intermediary.

U.S. Pat. No. 4,758,272 provided break through technology wherein it was disclosed that iron aluminum alloy powders could be successfully sintered, the disclosure of which is hereby incorporated by reference as filed. Therein, an oxide gettering process was employed thus enabling sintering of the alloy.

In copending U.S. patent application Ser. No. 219,986, filed July 15, 1988, it is disclosed that gettering such material is an option, and that sintering in an inert environment is operable as well. The disclosure therein is hereby incorporated by reference as filed. Both disclosures relate to the iron aluminum alloy system.

Aluminides of other metal and/or metal alloy systems have been as stubbornly resistant to sintering operations as was their cousin, iron aluminum. Various aluminide alloys could find useful employ as a porous structure if their alloyed powder starting materials were susceptible to sintering operations. Additionally, the ability to form structures of the aluminide material from a wet batch provides economies of production heretofore unseen in the workings of these materials.

The invention, herein disclosed, enables the use of powdered aluminides in wet batch forming operations, that have subsequently been successfully sintered into porous formed structures. The process for sintering the aluminides may be a one step operation or extended to multiple steps.

SUMMARY OF THE INVENTION

In the practice of the present invention, a porous sintered aluminide body is provided comprising metal mixes and/or alloys of aluminum, nickel, titanium, and/or rare earth metals, such as $ErAl_2$ Nickel and/or titanium in combination with from about 5 to up to 70% by weight aluminum compositions are preferred. Most preferred for these compositions are already prealloyed nickel aluminide, in either form as $NiAl$ or $Ni_3Al$, and prealloyed titanium aluminides, such as $TiAl$, $Ti_3Al$, and $TiAl_3$. The nickel, titanium, and/or rare earth metals comprise up to 85% by weight in composition and the aluminum component may be present up to 70% by weight. Optionally, sintering aids up to about 10% by weight, such as the alkaline earth metals magnesium and calcium, may be present in some optional combination with transition metals such as manganese, copper, cobalt, tin, and chromium. At times it is found advantageous to provide tungsten, boron, molybdenum, and/or silicon to the composition up to about 10% by weight for greater strength and/or to increase ductility.

Porosity of the resultant sintered structure is an important component of this invention. To allow for a range of porosity in the structure, a source of carbon is mixed with the batch prior to sintering. Those skilled in this art will recognize that any source of carbon capable of burnout at temperatures between about 400° C. and 1300° C. may be advantageously used to impart some measure of porosity. Methylcellulose is the most preferred carbon source. Porosities of up to about 75%, with preferred porosities of about up to 60%, of the structural component may be observed, resulting in structural properties which maintain useful mechanical integrity.

Porosity of the structure is essential if the structure is used as substrate for catalysis. The porosity of the structure provides a means whereby catalysts in some combination with high surface area binders, such as gamma alumina, may be advantageously combined with the surface of the substrate. The high surface area binder may take the form of a washcoat which may include a catalyst.

The addition of a source of carbon as an organic binder to the body of the aluminide composition complicates the process of firing the body to a sintered structure. Those familiar with aluminide compositions are well aware of the susceptibility of aluminum to oxidation. Once oxidized the aluminide is difficult or impossible to sinter. The present invention solves this problem in the art by adjusting the oxidation reduction environment of the reaction vessel. Simply, carbon becomes oxidized or hydrogenated dependent upon the atmosphere and aluminum or other metals are maintained in their reduced state. This may occur in a single step, with the various reaction mechanisms proceeding before or during sintering. Or by sintering, with the needed reactions finding their end by proceeding through a multistep process, thereby separating the method into a separate oxidizing, reducing, and densification steps.

The method of making the aluminide structures involves mixing the aluminide with a metal or mixing the aluminide as a prealloyed powder or some combination, with an organic binder, adding a solvent, such as water, a lubricant to aid plasticity, such as zinc stearate, a wetting agent, such as oleic acid, optionally adding a sintering aid, such as an alkaline earth or a suitable transition metal, and further mixing to provide a homogeneous batch. The batch is fired in a reducing environment, induced by the presence of hydrogen gas, argon or a mixture of hydrogen and some inert gas. Burnout of the source of carbon is optionally promoted by the presence of water or some other oxidant. Or, the presence of hydrogen cleanses the batch of carbon through decarburization. The aluminide and/or any other metal which may be present retain their reduced state due to the presence of the reducing or inert atmosphere. Consequently, the carbon source is demimimized without the effect of oxidizing the aluminides or metals.

Sintering can then be effected contemporaneous to the carbon oxidation while maintaining the oxidation state of the aluminide and/or metals, including aluminum added not as an aluminide. The end result of this one step process is a porous sintered aluminide structure. Sintering temperatures may vary from 1100° C. to 1450° C., the preferable sintering temperature is about 1300° C., ranging from 1250° C. to 1450° C.

Optionally, as another embodiment to aluminide processing, steps may be effected by separately treating the substrate for each required reaction mechanism inherent to the desired sintered aluminide. The first step in the firing cycle, after a similar mixing process as cited above, is the oxidation of the carbon. Carbon oxidation may be effected by adding an oxidant to the reaction vessel, thereby reacting the reduced carbon to a carbon oxide form. During this process the companion metal may become oxidized. Therefore, the next step in the process comprises reducing these constituents oxides formed in step one, back to the metal oxidation state.

One skilled in the art can appreciate that a reducing atmosphere may be provided by gettering agents for oxygen such as hydrogen gas and mixtures of hydrogen gas and an inert gas such as argon. Other gettering agents may be usefully employed, such as the alkaline earth metals. Thus returned to the aluminide and/or metal state, the structure is fired to sintering temperatures in either a reducing or inert atmosphere resulting in a porous yet densified structure comprised of metal aluminides. The multistep process is not preferred when sintering the titanium or rare earth aluminides. However, nickel aluminides and/or aluminum, and/or nickel powders or some combination thereof may be advantageously sintered by the multistep process.

Methods of forming the wet batch are well known to those skilled in the ceramic art. Forming by molding, pressing, hot pressing, isostatic pressing, and preferably by extruding through dies, are common ways to alter the structural geometry of the batch in the green or unfired state. In an advantageous use the present batch may be extruded into a honeycomb structure. The honeycomb may be variously characterized by the number of cells per square inch, cps, (or mm equivalents) anywhere from 25 cps to 2400 cps. Typically, prior to extrusion into a honeycomb structure the batch is first extruded through a spaghetti die and then extruded through the appropriate honeycomb die.

The size of the metal particles employed above is dependent upon the complexity of configured shape, the desired wall thickness, and the size of the desired pores in the final product. Hence, whereas coarse particles, e.g., particles passing a No. 6 U.S. Standard Sieve (3.36 mm), can be pressed into integral bodies, particles passing a No. 100 U.S. Standard sieve (149 microns) are much preferred for close control of porosity and size of pores, with particles passing a No. 325 U.S. Standard Sieve (44 microns) being the most preferred. The latter sized particles are of particular utility in the extrusion of honeycomb structures having very thin walls defining the cells The size of the pores is a function of particle size, temperature, and length of time provided for sintering. Hence, the pore size can vary widely. Excessively high temperatures and/or long firing times may lead to too small pores, whereas undersintering can leave too large pores. Nevertheless, the use of the body as a filter medium requires rather close control over pore size, the size demanded being dictated by the material to be removed from the fluid. In general, in honeycomb structures destined for filter media in exhaust streams of internal combustion engines, the pore size will be held within narrow ranges between about 1–100 microns, with pores tightly controlled in size between about 10–50 microns being preferred. For use as a structural component the pore size of the resultant aluminide structure is not a critical feature. However, pore size must be monitored to insure the mechanical integrity of the structure for its in place use and for desired mass.

Variations of this process will become apparent from the following examples and are not intended to be limiting in scope.

DETAILED DESCRIPTION OF THE INVENTION

In Example 1, 1734 grams of nickel powder (Alcan) and 266 grams of aluminum powder (Alcoa, stearic acid coated) were dry mixed with 120 grams of methylcellulose (Dow Chemical, Methocel K-75). 11 grams of oleic acid (Fisher Chemical) was added as a wetting agent for the metal powders. 20 grams of zinc and 10 grams of zinc stearate was added as lubricant. The dry ingredients were mixed in a Littleford blender, then the oleic acid added and the batch mixed again. The batch was placed in a muller for further mixing and enough water added to make the batch plastic. 100 and 400 cells per square inch honeycomb monoliths were extruded through a Wahlco 25 ton ram extruder. These structures were dried in a 100° C. oven to remove excess moisture, for about 48 hours.

The samples were fired in an alumina tube furnace using flowing gases. Generally, sintering of the structures was done either in one step or in multiple steps. Those skilled in this art can appreciate that the firing temperatures for the reduction step can vary from about 250° to about 650° C. The densification firing temperature ranged from about 1100° to 1450° C. Densification can occur in 100% argon or hydrogen gas or some combination of hydrogen and argon gas. It can also be appreciated that this multiple step process can be accomplished in a single step. That step comprises sintering in an inert, preferably argon, or reducing atmosphere at about 1300° C. Example 1 was fired at 1300° C. in argon. This sample did not sinter very well.

In Example 2, 1800 grams of Ni-31%Al (Shieldalloy, −325 mesh), 108 grams of Methocel. K-75, 11 grams of oleic acid, and 9 grams of zinc stearate were mixed as in Example 1. Example 2 was fired as in Example 1, this sample did not sinter very well.

In Example 3, 756 grams of Ni-31%Al (Shieldalloy, −325 mesh), 1044 grams of Ni powder (Alcan, 5–7 micron), 180 grams of sintering aid (Cu-Sn-Mg metal powder, 52:24:24 respectively), 108 grams of Methocel K-75, 11 grams of oleic acid, 9 grams of zinc stearate were mixed as in Example 1. Example 3 was sintered at about 1300° C. in argon. The samples sintered very well. Samples from this batch were also sintered in an argon-hydrogen mixture. These samples sintered very well also.

In Example 4, 756 grams of Ni-31%Al (Shieldalloy, −325 mesh), 1044 grams of Ni (Alcan 5–7 micron), 108 grams of Methocel K-75, 11 grams of oleic acid, and 9 grams of zinc stearate were mixed as in Example 1. This Example was sintered in both argon and argon-hydrogen mixtures at about 1300° C. All samples sintered very well.

Table 1 shows the remaining samples and the results obtained. Example 9 sinters very well, while Example 8 of similar composition sintered poorly. The Example 9 composition was mixed with a prealloyed Ti/Al powder.

TABLE 1

| Example | Weight % Composition | Firing T° C. | Atm. | Sinters |
|---------|---------------------|--------------|------|---------|
| 5 | 64 Ti/36Al | 1300° C. | Ar + H$_2$, Ar | very good |
| 6 | 64 Ti/36Al | 1300° C. | Ar + H$_2$, Ar | excellent |
| 7 | 84 Ti/16Al | 1300° C. | Ar + H$_2$, Ar | good |
| 8 | 37 Ti/63Al | 1300° C. | Ar + H$_2$, | poor |
| 9 | 37 Ti/63Al | 1300° C. | Ar | very good |
| 10 | 69 Ni/31Al | 1300° C. | Ar + H$_2$, Ar | no |
| 11 | 75 Er/25Al | 1300° C. | Ar | good |

The sintering aid in Example 3 was an aid to sintering of the high nickel compositions. However, as noted in Example 4, the alkaline earth sintering aid is not required to sinter this composition.

We claim:

1. A porous sintered structure, with total porosity between about 25% and about 75% by volume, comprised of aluminide compositions of metal selected from the group consisting of titanium, nickel, rare earth metals, the alloys thereof, combinations of said aluminide compositions, combinations of said aluminide compositions and said metal and/or aluminum.

2. The structure of claim 1 wherein said aluminide compositions consist essentially of aluminum up to 70% by weight and up to 85% by weight titanium, their alloys and combinations thereof.

3. The structure of claim 1 wherein said aluminide compositions consist essentially of aluminum up to 70% and up to 85% by weight nickel, their alloys and combinations thereof.

4. The structure of claim 1 wherein said aluminide compositions consist essentially of aluminum up to 70% and up to 85% by weight rare earth metals, their alloys and combinations thereof.

5. The structure of claim 1 wherein said structure comprises up to 10% by weight sintering aids selected from the group consisting of alkaline earth metals, transition metals, and combinations thereof.

6. The structure of claim 5 wherein said structure comprises metal sintering aids up to 10 weight % selected from the group consisting of manganese, copper, cobalt, tin, chromium and combinations thereof.

7. The structure of claim 1 wherein said structure comprises strength and/or ductility aids selected from the group consisting of tungsten, boron, molybdenum, silicon, and a combination thereof.

8. The structure of claim 5 wherein said sintering aids are selected from the group consisting of magnesium and calcium.

9. The structure of claim 1 wherein said aluminide composition comprises NiAl and/or its alloys.

10. The structure of claim 1 wherein said aluminide composition comprises Ni$_3$Al and/or its alloys.

11. The structure of claim 1 wherein said aluminide composition comprises TiAl and/or its alloys.

12. The structure of claim 1 wherein said aluminide composition comprises Ti$_3$Al and/or its alloys.

13. The structure of claim 1 wherein said aluminide composition comprises TiAl$_3$ and/or its alloys.

14. The structure of claim 1 wherein said aluminide composition comprises ErAl2 and/or its alloys.

15. A method for sintering porous aluminide structure comprising the steps of;
admixing either aluminide powders and/or metal powders forming aluminide during sintering or aluminide powder and metal powder, with a solvent, a binder, a lubricant, a wetting agent to form a batch and
firing said batch in an inert, reducing, or some combination thereof, atmosphere whereby said organic binder oxidizes and said aluminide and/or metal powders sinter.

16. The method of claim 15 wherein the batch of said admixing step comprises nickel or aluminum and nickel aluminides, and the firing step includes the steps of:
oxidation of said organic binder and of part of said nickel to metal oxide,
reduction of said nickel oxide, and
sintering said aluminide, said aluminum powder.

17. The method of claim 15 wherein said reducing atomsphere is hydrogen gas.

18. The method of claim 15 wherein said admixing includes an alkaline earth metal sintering aid selected from the group consisting of magnesium and calcium.

19. A porous sintered structure comprised of aluminide compositions of aluminum and metal selected from the group consisting of titantium, nickel, rare earth metals, the alloys thereof, combinations of said aluminide compositions, and combinations of said aluminide compositions and said metal, and wherein said structure is a honeycomb.

20. The structure of claim 19 in combination with a catalyst and placed in the exhaust pathway of an organically fueled power plant.

21. The structure of claim 19 in combination with a catalyst and placed in the exhaust pathway of an internal combustion engine.

22. The structure of claim 19 in combination with the exhaust pathway of a diesel engine.

23. The structure of claim 19 wherein said structure is a substructure to which other structural materials are added.

24. The structure of claim 1 with pore sizes substantially between 1 and 100 μm.

25. The structure of claim 1 with pore sizes substantially between 10 and 50 μm.

26. The structure of claim 1, 2, 3, 4 or 5 wherein the total porosity is between about 40% and about 60% by volume.

* * * * *

UNITED STATES PATENT AND TRADEMARK OFFICE
CERTIFICATE OF CORRECTION

PATENT NO. : 4,990,181
DATED : February 5, 1991
INVENTOR(S) : Kim D. Pierotti; Srinivas H. Swaroop; Raja R. Wusirika It is certified that error appears in the above-identified patent and that said Letters Patent is hereby corrected as shown below:

Col. 1, line 64 should have a "." after $ErAl_2$

Col. 6, line 8 "$TiA_{13}$" should read "$TiAl_3$"

Col. 6, line 10 "ErAl2" should read "$ErAl_2$"

Signed and Sealed this

Twenty-first Day of July, 1992

*Attest:*

DOUGLAS B. COMER

*Attesting Officer*     Acting Commissioner of Patents and Trademarks